(12) United States Patent
Charier et al.

(10) Patent No.: US 12,060,807 B2
(45) Date of Patent: *Aug. 13, 2024

(54) AIRCRAFT TURBINE ENGINE EQUIPPED WITH AN ELECTRICAL MACHINE

(71) Applicant: SAFRAN AIRCRAFT ENGINES, Paris (FR)

(72) Inventors: Gilles Alain Marie Charier, Moissy-Cramayel (FR); Caroline Marie Frantz, Moissy-Cramayel (FR); Loïc Paul Yves Guillotel, Moissy-Cramayel (FR); Vincent François Georges Millier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/287,487

(22) PCT Filed: Oct. 10, 2019

(86) PCT No.: PCT/FR2019/052403
§ 371 (c)(1),
(2) Date: May 18, 2021

(87) PCT Pub. No.: WO2020/084219
PCT Pub. Date: Apr. 30, 2020

(65) Prior Publication Data
US 2021/0396141 A1    Dec. 23, 2021

(30) Foreign Application Priority Data

Oct. 26, 2018 (FR) ...................................... 1859941

(51) Int. Cl.
*F01D 5/02* (2006.01)
*B64D 27/33* (2024.01)
(Continued)

(52) U.S. Cl.
CPC ............... *F01D 5/02* (2013.01); *B64D 27/33* (2024.01); *B64D 35/022* (2024.01);
(Continued)

(58) Field of Classification Search
CPC .......... F05D 2220/76–77; F05D 2230/60–642; F01D 15/10; F01D 5/025–026; F01D 5/06; H02K 7/1823; F02C 7/32; F02C 7/275

See application file for complete search history.

(56) References Cited

U.S. PATENT DOCUMENTS 3,264,482 A    8/1966   Clark et al.
6,914,344 B2 *   7/2005   Franchet ............... H02K 7/1823
                                                 60/668

(Continued)

FOREIGN PATENT DOCUMENTS

EP    1382802 A1    1/2004
EP    1841960 A1   10/2007
(Continued)

OTHER PUBLICATIONS

Written Opinion mailed Jan. 27, 2020, issued in corresponding International Application No. PCT/FR2019/052403, filed Oct. 10, 2019, 6 pages.

(Continued)

*Primary Examiner* — Stephanie Sebasco Cheng
(74) *Attorney, Agent, or Firm* — CHRISTENSEN O'CONNOR JOHNSON KINDNESS PLLC (57) ABSTRACT

An aircraft turbine engine includes a gas generator and a fan arranged upstream from the gas generator and configured to generate a main gas flow, one portion of which flows in a flow path of the gas generator to form a primary flow, and another portion of which flows in a flow path around the gas generator to form a secondary flow. The gas generator has a (Continued)

low-pressure body with a rotor driving the fan and a low-pressure compressor situated upstream from an intermediate housing. The turbine engine also includes an electric machine, mounted coaxially downstream from the fan and upstream from the intermediate housing. An intermediate shaft is driven by the rotor of the low-pressure body and drives rotors of the electric machine and of the low-pressure compressor.

10 Claims, 5 Drawing Sheets

(51) Int. Cl.
*B64D 35/022* (2024.01)
*B64D 35/023* (2024.01)
*B64D 35/024* (2024.01)
*B64D 35/026* (2024.01)
*F01D 15/10* (2006.01)
*F02C 7/268* (2006.01)
*F02C 7/32* (2006.01)
*F02C 7/36* (2006.01)

(52) U.S. Cl.
CPC ......... *B64D 35/023* (2024.01); *B64D 35/024* (2024.01); *B64D 35/026* (2024.01); *F01D 15/10* (2013.01); *F02C 7/268* (2013.01); *F02C 7/32* (2013.01); *F02C 7/36* (2013.01); *F05D 2220/323* (2013.01); *F05D 2220/76* (2013.01); *F05D 2230/60* (2013.01); *F05D 2240/20* (2013.01); *F05D 2240/60* (2013.01)

(56) References Cited

U.S. PATENT DOCUMENTS

| | | | |
|---|---|---|---|
| 7,224,082 B2* | 5/2007 | Bouiller | F02C 7/268 |
| | | | 290/52 |
| 7,479,717 B2* | 1/2009 | Bouiller | F01D 25/18 |
| | | | 310/90 |
| 8,519,555 B2* | 8/2013 | Dooley | H02P 9/00 |
| | | | 290/1 A |
| 8,579,538 B2* | 11/2013 | Juh | F01D 5/066 |
| | | | 403/359.5 |
| 10,012,082 B2* | 7/2018 | Muldoon | F01D 5/026 |
| 10,302,018 B2* | 5/2019 | Venter | F02K 3/06 |
| 10,458,338 B2* | 10/2019 | Szczepanowski | F02C 7/268 |
| 10,473,035 B2* | 11/2019 | Brault | F01D 5/02 |
| 10,487,747 B2* | 11/2019 | Curlier | F02C 7/36 |
| 11,067,003 B2* | 7/2021 | Stevenson | H02K 5/20 |
| 2006/0108807 A1* | 5/2006 | Bouiller | F02C 7/268 |
| | | | 290/52 |
| 2014/0150401 A1* | 6/2014 | Venter | F02C 7/36 |
| | | | 60/39.45 |
| 2016/0298548 A1* | 10/2016 | Brault | F02C 7/36 |
| 2019/0145322 A1* | 5/2019 | Sellick | F02C 7/36 |
| | | | 290/52 |

FOREIGN PATENT DOCUMENTS

| | | |
|---|---|---|
| EP | 2270315 A2 | 1/2011 |
| FR | 2842565 A1 | 1/2004 |
| FR | 2922265 A1 | 4/2009 |
| WO | 2006060014 A1 | 6/2006 |

OTHER PUBLICATIONS

International Preliminary Report on Patentability mailed Apr. 27, 2021, issued in corresponding International Application No. PCT/FR2019/052403, filed Oct. 10, 2019, 7 pages.

International Search Report mailed Jan. 27, 2020, issued in corresponding International Application No. PCT/FR2019/052403, filed Oct. 10, 2019, 6 pages.

Written Opinion of the International Searching Authority mailed Jan. 27, 2020, issued in corresponding International Application No. PCT/FR2019/052403, filed Oct. 10, 2019, 6 pages.

* cited by examiner

AIRCRAFT TURBINE ENGINE EQUIPPED WITH AN ELECTRICAL MACHINE

TECHNICAL FIELD

Embodiments of the present disclosure relate to an aircraft turbine engine equipped with an electric machine.

BACKGROUND

The background comprises in particular the document FR-A1-2 842 565 which describes an aircraft turbine engine equipped with an electric machine as well as the documents EP-A2-2 270 315, U.S. Pat. No. 3,264,482, FR-A1-2 922 265, EP-A1-1 841 960 and EP-A1-1 382 802.

The use of electrical energy is nowadays envisaged not only for functions of the aircraft but also for electrifying functions of the turbine engine.

This observation has led to the study of hybrid engine architecture solutions, combining fossil fuel energy and electrical energy to drive the propulsion part (fan of the turbine engine) and supply certain engine and/or aircraft functions.

These architectures can be based on a high bypass ratio and reduction gear type architecture, but also on a multiple body (2 or 3) architecture. In these architectures, the turbine engine comprises at least one low-pressure body and one high-pressure body, each body comprising a shaft connecting a rotor of a compressor to a rotor of a turbine.

It is known to provide an aircraft turbine engine with an electric machine. It is recalled that an electric machine is an electromechanical device based on electromagnetism allowing the conversion of electrical energy into mechanical energy, for example. This process is reversible and can be used to produce electricity from mechanical energy.

Thus, depending on the end use of a machine, we use the terms:
 generator to designate an electric machine producing electrical energy from a mechanical energy,
 motor for an electric machine producing a mechanical energy from an electrical energy.

An electric machine can also behave in motor mode as well as in generator mode.

The integration of a high-powered electric machine on the low-pressure body of a turbine engine, in particular of the high bypass ratio type, is very complex. Several installation areas are possible but the advantages and the disadvantages of each are numerous and diverse (problem of mechanical integration of the machine, temperature resistance of the machine, accessibility of the machine, etc.).

One of the major problems of the integration of an electric machine into a turbine engine is to have an environment configured to accepting the limited temperature of its components (around 150° C.). In addition, as the overall efficiency of the machine is necessarily less than 100%, the heat released by the losses must be removed. On machine sizes of more than 1 MW, the power dissipated is then significant (50 KW minimum). One solution would be to cool the stator of the machine with oil. However, if the machine is in an oil enclosure, the oil may leak directly into the enclosure with the risk of pollution by particles from the machine. If the machine is in a dry environment, then the cooling system must be sealed and it must be possible to recover any leaks. The oil cooling therefore has its disadvantages.

Another major difficulty is related to respecting the modular aspect of the turbine engine. It is indeed desirable to integrate an electric machine module configured to being mounted in the gas generator in one go.

The present disclosure provides a solution to at least one part of the above problems.

SUMMARY

Embodiments of the disclosure provide an aircraft turbine engine, comprising a gas generator and a fan arranged upstream from the gas generator and configured to generate a main gas flow, one portion of which flows in a duct of the gas generator to form a primary flow, and another portion of which flows in a duct around the gas generator to form a secondary flow, the gas generator comprising a low-pressure body that comprises a rotor driving the fan and that comprises a low-pressure compressor situated upstream from an intermediate casing, the turbine engine further comprising an electric machine, characterised in that the electric machine is mounted coaxially with the rotor of the low-pressure body downstream from the fan and upstream from the intermediate casing, the turbine engine further comprising an intermediate shaft that is driven by the rotor of the low-pressure body and that drives rotors of the electric machine and of the low-pressure compressor.

The present disclosure thus offers a solution for integrating an electric machine, a first advantage being linked to the fact that, in the integration area of this machine, the temperatures prevailing there are relatively low and therefore optimal for this machine. In addition, the machine can be cooled by the primary flow, which optimises the service life of the machine. The electric machine is preferably situated outside any lubricating oil enclosure of a bearing, so that there is no risk of oil pollution of this machine.

The rotors of the low-pressure compressor and of the electric machine are coupled to the rotor of the low-pressure body by means of an intermediate shaft which allows and facilitates the modular assembly of the turbine engine. In fact, it is sufficient to mount and attach the different rotors on each other to achieve the assembly of the turbine engine.

The turbine engine according to the disclosure may comprise one or more of the following characteristics, taken in isolation from each other or in combination with each other:
 the electric machine is situated upstream from the low-pressure compressor,
 the electric machine is situated downstream from the low-pressure compressor,
 the electric machine comprises a stator which surrounds its rotor and which is configured to be cooled by the primary flow,
 the stator of the electric machine comprises a radially outer surface swept by the primary flow,
 the electric machine comprises a stator which surrounds its rotor and which is itself surrounded by a shell, this shell being spaced radially from the stator and comprising a radially outer surface swept by the primary flow,
 the electric machine comprises a stator which is surrounded by its rotor,
 the intermediate shaft has a generally tubular shape and is configured to be passed through by the rotor of the low-pressure body, the intermediate shaft comprising internal splines for rotational coupling to the rotor of the low-pressure body,
 the intermediate shaft comprises adjacent sections intended to be surrounded respectively by a trunnion of the rotor of the low-pressure compressor, and either by a member connected or attached to the rotor of the electric machine or by a part connected or attached to the rotor of the electric machine, the intermediate shaft comprising external splines for coupling to the trunnion and to the member or to the part, the trunnion, on the one hand, and the member or the part, on the other hand, are clamped axially against each other and on a cylindrical shoulder of the intermediate shaft, by a nut fitted and screwed onto the intermediate shaft, the fan is driven by the rotor of the low-pressure body by means of a reduction gear, the electric machine being situated downstream from the reduction gear, which comprises an input shaft, a downstream end of which is engaged on an upstream end of the rotor of the low-pressure body and is clamped axially against the intermediate shaft by a fitted and attached nut on this upstream end.

The present disclosure further relates to a method of modular assembly of a turbine engine as described above, comprising the steps of:

a) mounting and attaching the rotor or the electric machine and the rotor of the low-pressure compressor on the intermediate shaft by axial translation, and b) mounting and attaching the intermediate shaft on the rotor of the low-pressure body by axial translation.

The method may further comprise an additional step of c) mounting and attaching the input shaft of the reduction gear on the rotor of the low-pressure body by axial translation.

DESCRIPTION OF THE DRAWINGS

The disclosure will be better understood and other details, characteristics and advantages of the disclosure will become apparent from the following description made by way of non-limiting example with reference to the attached drawings, in which.

DETAILED DESCRIPTION

Figure 1:
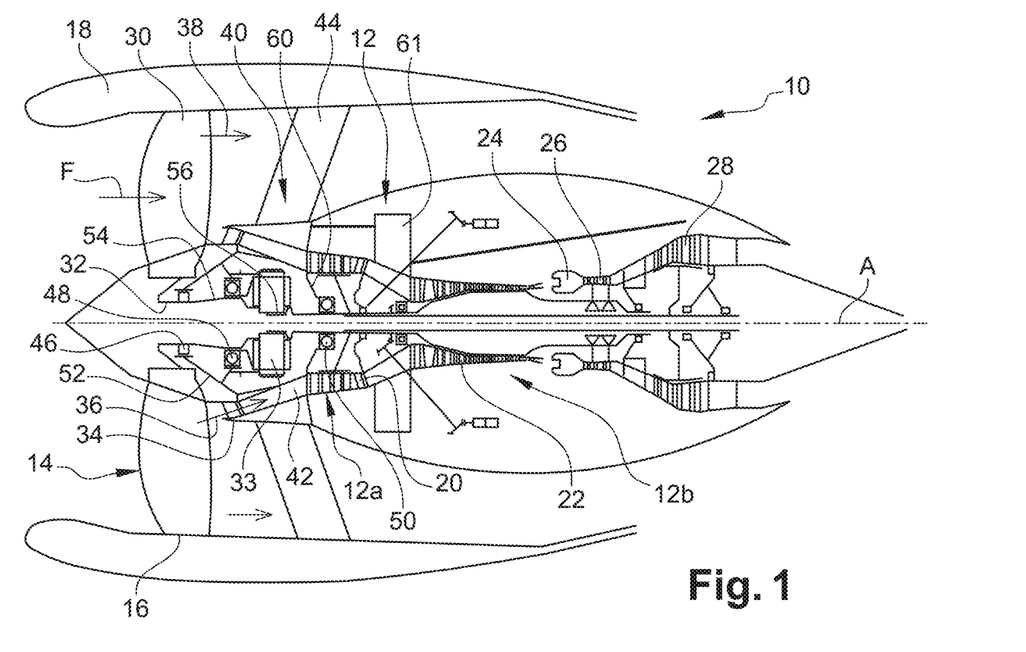
FIG. 1 is a schematic axial sectional view of an aircraft turbine engine with a high bypass ratio and reduction gear.

Reference is first made to FIG. 1 which schematically represents a double-body and double-flow aircraft turbine engine 10.

The turbine engine 10 conventionally comprises a gas generator 12, upstream of which is arranged a fan 14. The fan 14 is surrounded by a fan casing 16 which is surrounded by a nacelle 18 which extends around and along a major part of the gas generator 12.

The gas generator 12 comprises here two bodies, namely a low-pressure body 12a or LP and a high-pressure body 12b or HP. Each body comprises a compressor and a turbine.

The terms "upstream" and "downstream" are considered along a main direction F of gas flow in the turbine engine 10, this direction F being parallel to the longitudinal axis A of the turbine engine.

From upstream to downstream, the gas generator 12 comprises a low-pressure compressor 20, a high-pressure compressor 22, a combustion chamber 24, a high-pressure turbine 26 and a low-pressure turbine 28.

The low-pressure 20 and high-pressure compressor 22 are separated from each other by an intermediate casing 61.

The fan 14 comprises an annular row of vanes 30 rotated by a fan shaft 32 which is connected to the rotor of the low-pressure body 12a via a reduction gear 33. The gas flow through the fan (arrow F) is separated upstream from the gas generator 12 by an annular splitter 34 into a radially inner annular flow, referred to as primary flow 36 which feeds the gas generator 12, and a radially outer annular flow, referred to as secondary flow 38 which flows between the gas generator 12 and the nacelle 18 and supplies most of the thrust of the turbine engine.

An inlet casing 40 structurally connects the gas generator 12 to the fan casing 16 and the nacelle 18. As with the intermediate casing 61, the inlet casing 40 comprises an annular row of radially inner arms 42 extending into the primary flow 36, and an annular row of radially outer guide vanes 44 (OGV type) extending into the secondary flow 38. The arms 42 are generally limited in number (less than ten) and are tubular and have auxiliaries passing through them. The number of vanes 44 (OGV) is generally greater than ten.

The rotor of the low-pressure body 12a and the fan shaft 32 are guided upstream by bearings 46, 48 and 50. These bearings 46, 48, 50 are for example of the ball or rolling element type and each comprise an inner bearing ring mounted on the shaft to be guided, an outer bearing ring carried by an annular bearing support and a bearing between the bearing rings.

In a known manner, the reduction gear 33 is of the epicyclic type and comprises a sun gear centred on the axis A, a ring gear extending around the axis and planet gears which mesh with the sun gear and the ring gear and are carried by a planet gear carrier.

In the example shown, the ring gear 33b is attached and fixedly connected to a support 52 of the bearings 46, 48. The planet carrier is rotatable and connected to an output shaft 54 of the reduction gear which further comprises an input shaft 56 meshed with the sun gear. The input shaft 56 is coupled to the main shaft 70 of the low-pressure body, and the output shaft 54 is coupled to the fan shaft 32.

The input shaft 56 is guided by the bearing 50 which is carried by a bearing support 60 (FIG. 1). The output shaft 54 is guided by the bearings 46, 48.

The bearing supports 52, 60 extend around the axis A and are fixed parts connected to the stator and for example to the input casing 40.

Figure 2:
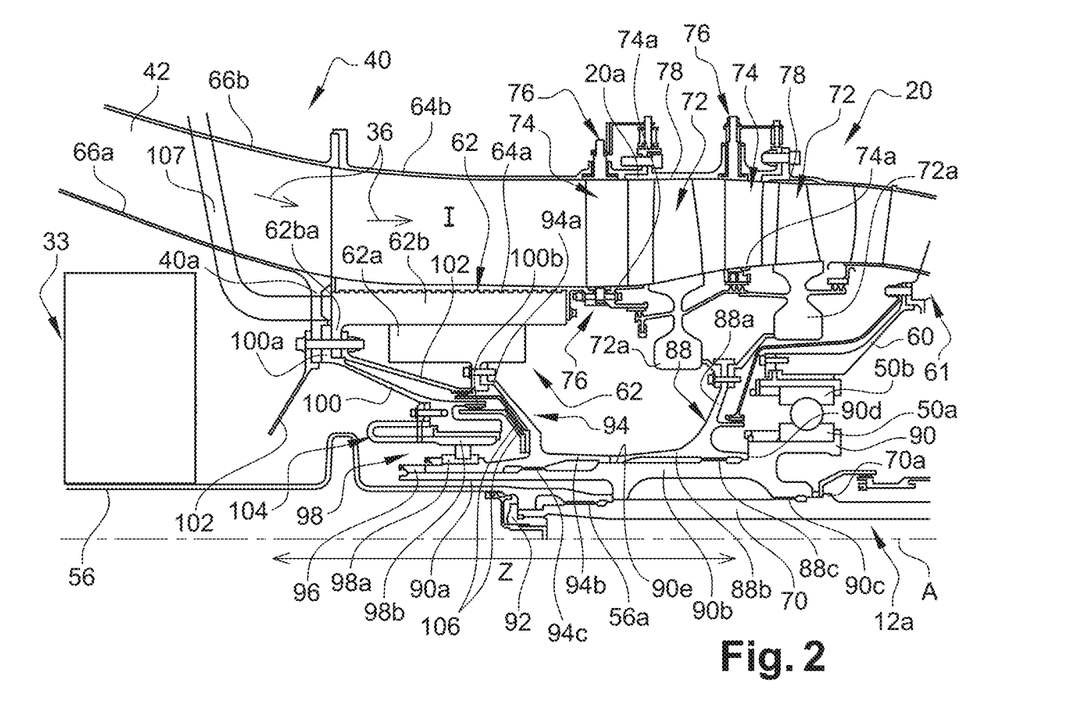
FIG. 2 is a partial schematic half-view in axial section of an aircraft turbine engine according to the disclosure equipped with an electric machine.

FIG. 2 is a larger scale view of a part of a turbine engine and illustrates an installation area of an electric machine 62, this area Z being situated here downstream from the reduction gear 33 and upstream from the intermediate casing 61.

This annular area Z is delimited radially on the inside by the main shaft 70 of the low-pressure body 12a and by the input shaft 56 of the reduction gear 33, and radially on the outside by the elements which delimit internally the flow duct I of the primary flow 36. These elements comprise, from upstream to downstream, on the one hand an internal annular wall 66a, an annular shell 64a, then the discs 72a of the wheels 72 and the internal platforms 74a of the bladed rectifiers 74 of the low-pressure compressor 20.

The wall 66a surrounds the reduction gear 33 and forms part of the inlet casing 40 as it is connected to the radially inner ends of the arms 42 the radially outer ends of which are connected to another outer annular wall 66b. The shell 64a extends around the electric machine 62 and as an extension of the wall 66a.

The shell 64a is an inner shell and is surrounded by an outer shell 64b, the shells 64a, 64b defining between them a portion of the flow duct I or the primary flow 36 downstream from the inlet casing 40 and upstream from the low-pressure compressor 20 and the intermediate casing 61. The shell 64b extends from the downstream end of the wall 66b to a wall 20a which surrounds the wheels 72 and the rectifiers 74 of the low-pressure compressor 20. The shell 64b may be connected to or formed in one piece with this wall 20a.

Classically, this wall 20a comprises, on the one hand, means 76 for guiding in rotation and for varying the pitch of the vanes of the rectifiers 74 about substantially radial axes, and abradable annular coatings 78 surrounding the wheels 72.

The shell 64a has its downstream end also connected or attached to means 76 for guiding in rotation the guide vanes 74 about the same axes. As can be seen more clearly in FIG. 3, an annulus 80 is fitted and attached to the downstream end of the shell 64a by an annular series of substantially axially extending screws 82. The shell 64a and the annulus 80 form one of the aforementioned platforms 74a and define between them radially oriented cylindrical housings 84 for receiving and guiding radially inner cylindrical pivots 74b of the guide vanes 74. The pivot of each vane may be guided in this housing 84 by a cylindrical sleeve 86 which may be held radially in the housing by means of screws 82 for example.

Figure 3:
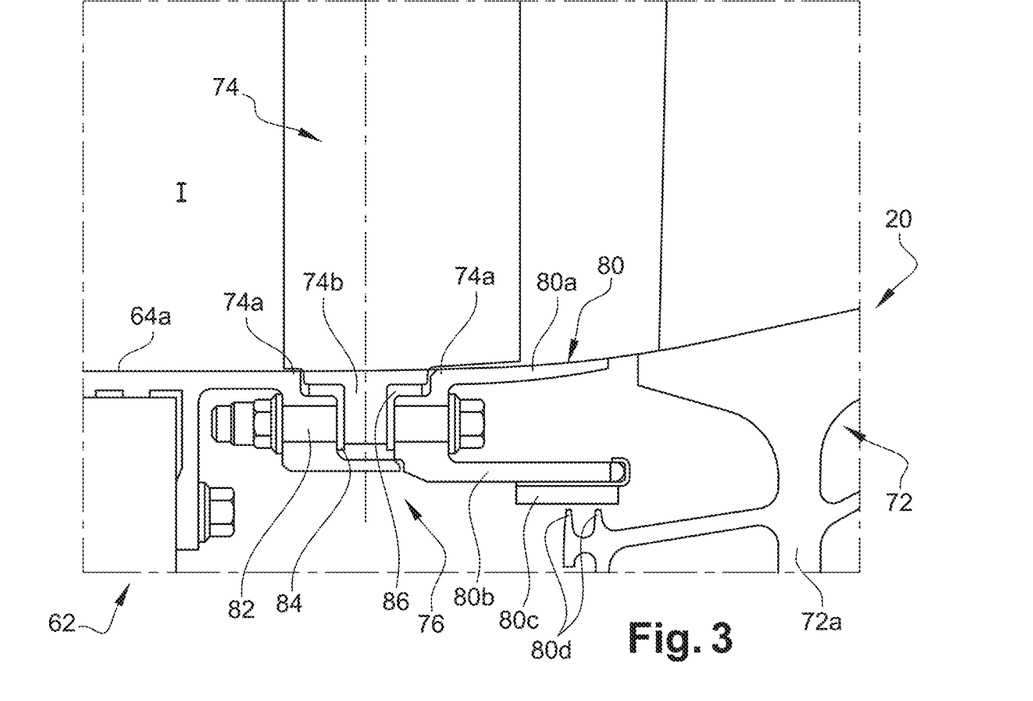
FIG. 3 is a larger scale view of a detail of FIG. 2.

The annulus 80 is generally C-shaped in axial section, the opening of which is axially oriented. This annulus 80 comprises a substantially cylindrical outer peripheral rim 80a which extends in the extension of the shell 64a and defines the duct I internally, and a substantially cylindrical inner peripheral rim 80b which carries an annular coating 80c made of an abradable material intended to cooperate with lips 80d carried by the disc 72a of the upstream wheel of the compressor 20.

The discs 72a of the wheels 72 of the compressor 20 are attached to a trunnion 88 which is driven by the shaft 70 via an intermediate shaft 90 (FIG. 2).

The trunnion 88 is annular in shape and has a general T-shape in axial section. The trunnion 88 comprises a radial annular leg 88a the inner periphery of which is connected to a cylindrical leg 88b. The outer periphery of the radial leg 88a is attached by screws to flanges of the discs 72a of the wheels 72, and the cylindrical leg 88b comprises internal splines 88c for coupling to external splines of the intermediate shaft 90.

The intermediate shaft 90 is generally tubular in shape and comprises an upstream section 90a and a downstream section 90b. The trunnion 88 is mounted on the downstream section 90b of the intermediate shaft 90, this downstream section 90b comprising internal splines 90c for coupling to external splines of the main shaft 70, as well as a cylindrical shoulder 90d for axial support towards the downstream of the trunnion 88 and in particular of the downstream end of its cylindrical leg 88b. The intermediate shaft 90 may further comprise an external cylindrical surface 90e for centring the leg 88b and thus the trunnion 88.

The upstream section 90a of the intermediate shaft 90 extends around the downstream end of the input shaft 56 of the reduction gear 33. This input shaft 56 comprises internal splines 56a for coupling with external splines of the main shaft 70. Furthermore, a nut 92 is axially clamped at the upstream end of the main shaft 70 and is axially supported on the input shaft 56 to clamp it axially against the intermediate shaft 90 which itself is axially supported on a cylindrical shoulder 70a of the main shaft 70.

At its downstream end, the intermediate shaft 90 carries the inner bearing ring 50a of the bearing 50, in this case a ball bearing, the outer bearing ring 50b of which is carried by the bearing support 60. This support 60 has a generally frustoconical shape and is flared axially towards the downstream. Its larger diameter downstream end is attached to the intermediate casing 61.

This type of bearing 50 is typically lubricated and is situated in an annular lubrication enclosure which is sealed to prevent any oil leakage, particularly towards the upstream, in the implementation area Z where the electric machine 62 is situated.

The machine 62 has a generally annular shape and comprises a rotor 62a and a stator 62b which surrounds the rotor 62a. The rotor 62a has a generally cylindrical shape extending about the axis A and is attached to an annular member 94 also extending about the axis A.

The member 94 is generally T-shaped in axial section. The member 94 comprises a radial annular leg 94a the inner periphery of which is connected to a cylindrical leg 94b. The outer periphery of the radial leg 94a is attached by screws to the rotor 62a, and the cylindrical leg 94b comprises internal splines 94c for coupling to external splines of the intermediate shaft 90, and in particular of its upstream section 90a.

The downstream end of the cylindrical leg 94b is, on the one hand, axially supported on the upstream end of the cylindrical leg 88b of the trunnion 88, and, on the other hand, cooperates with the cylindrical centring surface 90e carried by the intermediate shaft 90.

A nut 96 is axially clamped at the upstream end of the intermediate shaft 90 and is axially supported on the member 94 to urge it axially against the trunnion 88.

At its upstream end, the cylindrical leg 94b of the member 94 carries an inner bearing ring 98a of a bearing 98, here with rolling elements, the outer bearing ring 98b of which is carried by another annular bearing support 100. This support 100 has a generally frustoconical shape and is flared axially towards the upstream. Its larger diameter upstream end is attached to the stator 62b of the electric machine 62.

The stator 62b is also generally cylindrical in shape. It comprises at its upstream end a radially inner annular flange for fastening a plurality of flanges, one 100a of which is of the bearing support 100. The flange 62ba of the stator 62b is also attached to a flange 40a of the inlet casing 40, as well as to flanges of sealing cowls 102 and/or deflectors.

The inner periphery of the bearing support 100 may be provided with an oil film damping system 104, known as a squeeze-film. It may further comprise a cylindrical flange 100b oriented towards the downstream and comprising an internal annular coating of abradable material.

Two annular sealing cowls 106 may be attached to the member 94 and in particular to its radial leg 94a, and carry radially external annular lips intended to cooperate on the one hand with the coating carried by the flange 100b, as well as with a similar coating carried by one of the cowls 102 attached to the flange 62ba of the stator 62b.

The bearing 98 is conventionally lubricated and is situated in an annular lubrication enclosure which is sealed to prevent any oil leakage in particular towards the downstream, in the area Z of implantation of the electric machine 62.

The stator 62b is connected by an electric cable 107 to a control circuit, this cable 107 passing here through a tubular arm 42 of the inlet casing 40.

One of the particularities of this installation lies in the fact that the electric machine 62 and in particular its stator 62b is situated as close as possible to the primary flow 36. This enables, on the one hand, to have an electric machine 62 with a large diameter and therefore with a higher potential power than the technologies proposed up to now, and on the other hand, to have a machine which is cooled by the primary flow 36. In a particular embodiment of the disclosure, 30 KW could be dissipated by this cooling.

To this end, the shell 64 which extends, preferably directly, around the stator 62b, has its radially outer surface swept by the flow 36 and may additionally have an aerodynamic profile, as shown in the drawing. The shell 64a ensures the heat exchange by thermal conduction between the stator 62b and the flow 36.

Figure 4:
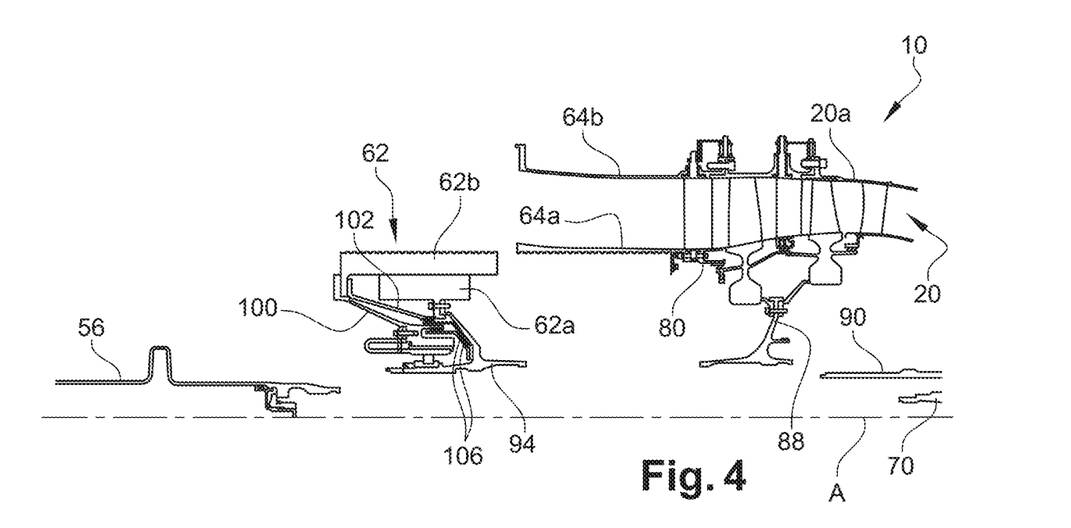
FIG. 4 is a partial schematic axial sectional view of the electric machine and the turbine engine FIG. 2, and illustrates steps of an assembly method according to the disclosure.

FIG. 4 illustrates steps for the assembly of the turbine engine 10 and in particular of modules of this turbine engine.

A first step illustrated in FIG. 4 consists of assembling the machine 62, i.e., inserting the rotor 62a into the stator 62b, by first attaching the bearing support 100 to the stator 62b, and the member 94 to the rotor 62a. The cowls 102, 106 may also be attached to this assembly.

The shell 64a can then be mounted around the machine 62 and the module so formed can be attached to the compressor 20, in particular by attaching the downstream end of the shell 64a to the annulus 80. The shell 64b is already pre-mounted on the wall 20a of the compressor 20, or formed in one piece with this wall 20a.

The machine 62 and the compressor 20 can then be engaged on the intermediate shaft 90 which is previously mounted on the main shaft 70 or subsequently mounted on this shaft 70. The trunnion 88 of the compressor 20 is coupled with the intermediate shaft 90 and then the member 94 is coupled with this intermediate shaft and is axially supported on the trunnion 88. The nut 96 clamps the member 94 and the trunnion 88 against the shoulder 90d of the intermediate shaft.

The input shaft 56 of the reduction gear 33 is then engaged by axial translation from upstream between the shaft 70 and the intermediate shaft 90. The input shaft 56 is coupled with the main shaft 70 and the nut 96 is clamped to axially lock the input shaft as well as the intermediate shaft 90 to the main shaft 70.

Figure 5:
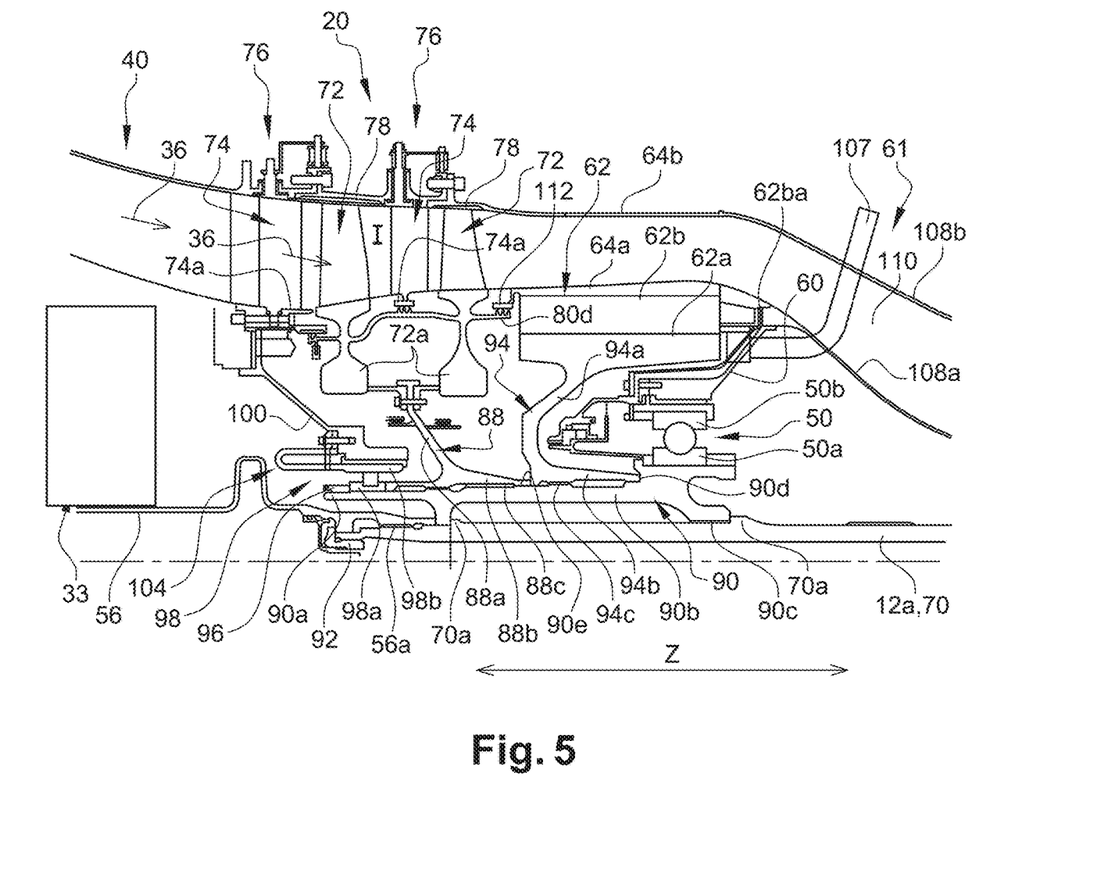
FIG. 5 is a partial schematic half-view in axial section of an aircraft turbine engine according to an alternative embodiment of the disclosure.

FIG. 5 illustrates an alternative embodiment of a turbine engine according to the disclosure.

The elements described in the foregoing and which are found in this alternative embodiment are designated by the same references.

The implementation area Z of the electric machine 62 is here situated downstream from the reduction gear 33 and the compressor 20, and upstream from the intermediate casing 61.

This annular area Z is delimited radially on the inside by the main shaft 70 of the low-pressure body 12a as well as by the input shaft 56 of the reduction gear 33, and radially on the outside by the elements which delimit internally the flow duct I of the primary flow 36. These elements comprise here, from upstream to downstream, the discs 72a of the wheels 72 and the internal platforms 74a of the bladed rectifiers 74 of the low-pressure compressor 20, the annular shell 64a, and then an internal annular wall 108a.

The wall 108a forms part of the intermediate casing as it is connected to the radially inner ends of arms 110 the radially outer ends of which are connected to another outer annular wall 108b. The shell 64a extends around the electric machine 62 and into the extension of the discs 72a of the wheels 72 and the internal platforms 74a of the bladed rectifiers 74 of the compressor 20.

The shell 64a is an inner shell and is surrounded by an outer shell 64b, the shells 64a, 64b defining between them a portion of the flow duct I of the primary flow 36 downstream from the low-pressure compressor 20 and upstream from the intermediate casing 61. The shell 64b extends from the downstream end of the wall 20a to an outer annular wall 108b which is connected to the radially outer ends of the arms 110 and thus forms part of the intermediate casing 61. The shell 64b may be connected to or formed in one piece with the wall 20a.

Classically, this wall 20a comprises, on the one hand, means 76 for guiding in rotation and for varying the pitch of the vanes of the rectifiers 74 about substantially radial axes, and abradable annular coatings 78 surrounding the wheels 72.

The shell 64a comprises at its upstream end a cylindrical flange 112 oriented towards the upstream and carrying an annular coating of abradable material intended to cooperate with lips 80d carried by the disc 72a of the downstream wheel of the compressor 20.

The discs 72a of the wheels 72 of the compressor 20 are attached to a trunnion 88 which is driven by the shaft 70 via an intermediate shaft 90.

The trunnion 88 is annular in shape and has a generally T-shaped axial section. The trunnion 88 comprises a radial annular leg 88a the inner periphery of which is connected to a cylindrical leg 88b. The outer periphery of the radial leg 88a is attached by screws to flanges of the discs 72a of the wheels 72, and the cylindrical leg 88b comprises internal splines 88c for coupling to external splines of the intermediate shaft 90.

The intermediate shaft 90 is generally tubular in shape and comprises an upstream section 90a and a downstream section 90b. The trunnion 88 is mounted on the upstream section 90a of the intermediate shaft 90, the shaft 90 comprising internal splines 90c for coupling to external splines of the main shaft 70. The intermediate shaft 90 may further comprise an outer cylindrical surface 90e for centring the leg 88b and thus the trunnion 88.

The input shaft 56 of the reduction gear 33 comprises internal splines 56a for coupling with external splines of the main shaft 70. Furthermore, a nut 92 is axially clamped at the upstream end of the main shaft 70 and is axially supported on the input shaft 56 to axially clamp it against the trunnion 88 which itself is axially supported on a cylindrical shoulder 70a of the main shaft 70.

At its downstream end, the intermediate shaft 90 carries the inner bearing ring 50a of the bearing 50, in this case a ball bearing, the outer bearing ring 50b of which is carried by the bearing support 60. This support 60 has a generally frustoconical shape and is flared axially towards the downstream. Its larger diameter downstream end is attached to the intermediate casing 61.

This type of bearing 50 is typically lubricated and is situated in an annular lubrication enclosure which is sealed to prevent any oil leakage, particularly towards the upstream, in the implementation area Z of the electric machine 62.

The machine 62 has a generally annular shape and comprises a rotor 62a and a stator 62b which surrounds the rotor 62a. The rotor 62a has a generally cylindrical shape extending about the axis A and is connected to an annular member 94 also extending about the axis A.

The member 94 has a general T or C shape in axial section. The member 94 comprises a radial annular leg 94a the inner periphery of which is connected to a cylindrical leg 94b. The outer periphery of the radial leg 94a is connected to the rotor 62a, and the cylindrical leg 94b comprises internal splines 94c for coupling to external splines of the intermediate shaft 90, and in particular of its downstream section 90b.

The downstream end of the cylindrical leg 94b is on the one hand axially supported on a cylindrical shoulder 90d of the intermediate shaft 90, and its upstream end is axially supported towards the upstream on the downstream end of the trunnion 88. This upstream end of the leg 94b cooperates and on the other hand with the cylindrical centring surface 90e carried by the intermediate shaft 90.

A nut 96 is axially clamped at the upstream end of the intermediate shaft 90 and is axially supported on the trunnion 88 to urge it axially against the member 94. At its upstream end, the intermediate shaft 90 carries an inner bearing ring 98a of a bearing 98, here with rolling elements, the outer bearing ring 98b of which is carried by another annular bearing support 100. This support 100 has a generally frustoconical shape and is flared axially towards the upstream. Its larger diameter upstream end is attached to the inlet casing 40.

The stator 62b is also generally cylindrical in shape. It comprises at its downstream end an annular flange 62ba for attachment of a plurality of flanges, one of which is of the shell 108a. The flange 62ba of the stator 62b is also attached to a flange of the bearing support 60.

The inner periphery of the bearing support 60 may be provided with an oil film damping system 104, known as a squeeze-film.

The bearing 98 is typically lubricated and is situated in an annular lubrication enclosure which is sealed to prevent any oil leakage particularly towards the downstream in the implementation area Z of the electric machine 62.

The stator 62b is connected by an electric cable 107 to a control circuit, this cable 107 passing here through a tubular arm 110 of the intermediate casing 61.

As in the previous embodiment, the shell 64a which extends, preferably directly, around the stator 62b, has its radially outer surface swept by the flow 36 and may further have an aerodynamic profile, as shown in the drawing. The shell 64a ensures the heat exchange by thermal conduction between the stator 62b and the flow 36.

Figure 6:
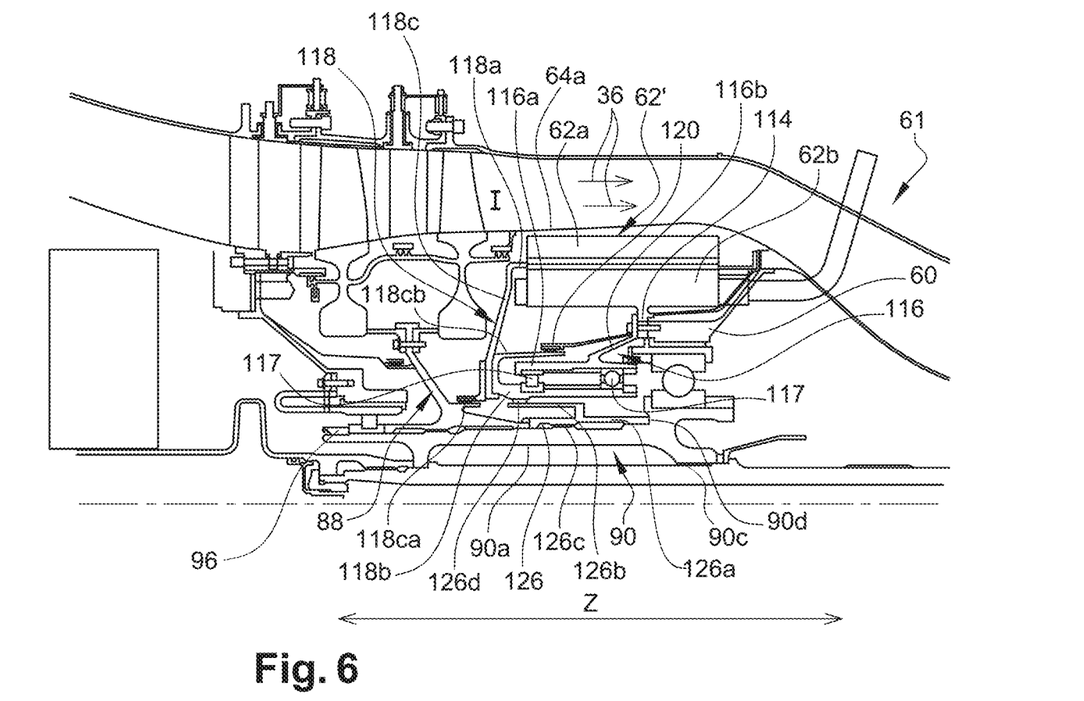
FIG. 6 is a partial schematic half-view in axial section of an aircraft turbine engine according to another alternative embodiment of the disclosure.
Figure 7:
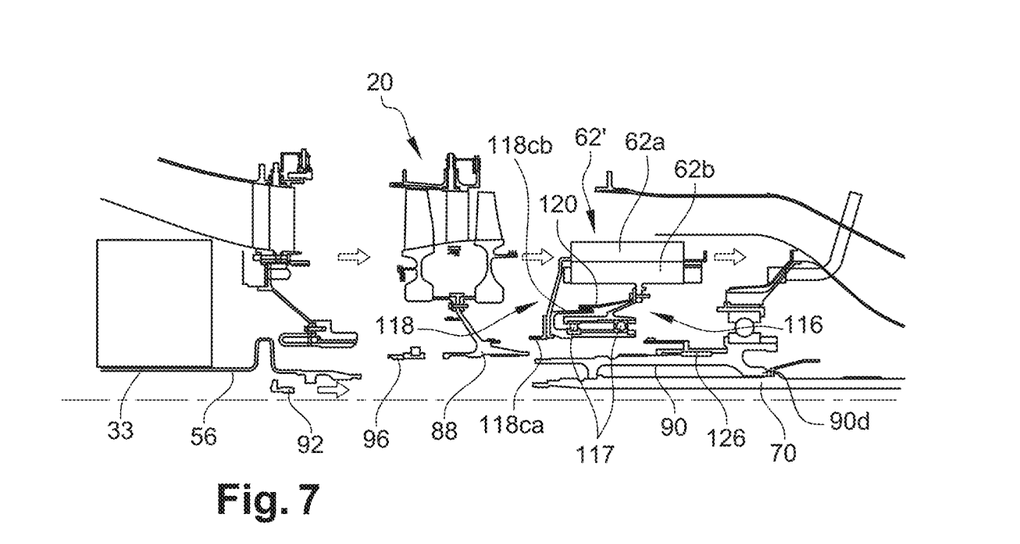
FIG. 7 is a partial schematic view in axial section of the electric machine and the turbine engine of FIG. 6, and illustrates steps in an assembly method according to the disclosure.

FIGS. 6 and 7 illustrate another alternative embodiment of the disclosure. The installation area Z of the electric machine 62' is here similar to that of the previous embodiment FIG. 5.

The electric machine 62' differs from the machine 62 of the previous embodiment in that the rotor 62a here extends around the stator 62b and is thus situated as close as possible to the flow duct I of the primary flow 36.

The stator 62b is attached to the intermediate casing 61 and the bearing support 60, as discussed above. The stator 62b further comprises a radially inner annular flange 114 for attachment of another annular support 116 for bearings 117 here for guiding in rotation the rotor 62a.

This bearing support 116 is generally T-shaped in cross-section and comprises a radially inner cylindrical leg 116a connected to the inner periphery of a substantially frustoconical annular leg 116b, the outer periphery of which is attached to the flange 114.

The rotor 62a has a generally cylindrical shape and is connected to or integrated with an annular member 118 having a generally C-shaped axial section. This member 118 comprises two annular portions, respectively inner 118b and outer 118a, which extend around each other and the upstream ends of which are connected to each other by an annular bottom 118c. The member 118 thus defines an opening which is here oriented axially towards the downstream and in which the stator 62b and the bearing support 116 are housed.

The rotor 62a is integrated into the outer portion 118a of the member 118 or forms this outer portion 118a. This outer portion 118a is surrounded, in this case directly by the shell 64a with a predetermined clearance.

The bottom 118c of the member 118 comprises an annular web 118cb extending axially towards the downstream and thus into the opening and cooperating in a sealing manner with the bearing support 116 or an annular cowl 120 attached to the flange 114. The seal is ensured by a labyrinth seal, the annular lips of which are carried by the web 118cb, for example, and the abradable coating is carried by the cowl 120.

The bottom 118c further comprises an annular web 118ca extending axially upstream and cooperating in a sealing manner with the trunnion 88. The seal is ensured by a labyrinth seal, the annular lips of which are carried by the trunnion 88, for example, and the abradable coating is carried by the web 118ca.

The portion 118b of the member 118 extends radially inside the stator 62b and the bearing support 116, and the bearings 117 are mounted between the portion 118b and this bearing support 116 in order to guide in rotation the rotor 62a with respect to the stator 62b.

The bearings 117 are here two in number and axially spaced from each other. By way of example, the upstream bearing is rolling element bearing and the downstream bearing is ball bearing.

The member 118 and in particular its portion 118b surrounds the downstream section 90b of the intermediate shaft 90 and is coupled to this shaft by means of an annular coupling part 126, which is also a damping part here.

This part 126 is here clamped axially between the trunnion 88, situated upstream, and the shoulder 90d of the intermediate shaft 90, and thus in place of the cylindrical leg 94b of the previous embodiment.

The part 126 comprises a radially inner cylindrical portion 126a extending between the trunnion 88 and the shoulder 90d and coupled by internal splines 126c to complementary external splines of the intermediate shaft 90, and a radially outer flexible portion 126b. This portion 126b has a C-shaped axial half-section, the opening of which is oriented axially, here towards the upstream. This portion 126b comprises at its outer periphery external splines 126d which cooperate with complementary internal splines of the portion 118b of the member 118.

FIG. 7 illustrates steps for assembling the turbine engine 10 of FIG. 6 and in particular modules of this turbine engine.

A first step consists of assembling the machine 62', i.e. inserting the stator 62b, the bearing support 116 and the bearings 117, into the opening delimited by the rotor 62a and its member 118. The webs 118ca, 118cb and cowl 120 may also be attached to this assembly.

The machine 62' and the compressor 20 can then be engaged on the intermediate shaft 90 which is previously mounted on the main shaft 70. The trunnion 88 of the compressor 20 is coupled with the intermediate shaft 90 and is axially supported on the part 126 previously mounted on the shaft 90. The nut 96 clamps the trunnion 88 and this part 126 against the shoulder 90*d* of the intermediate shaft 90.

The input shaft 56 of the reduction gear 33 is then engaged by axial translation from downstream, between the shaft 70 and the intermediate shaft 90. The input shaft 56 is coupled to the main shaft 70 and the nut 92 is clamped to axially lock the input shaft 56 and the intermediate shaft 90 to the main shaft 70.

Figure 8:
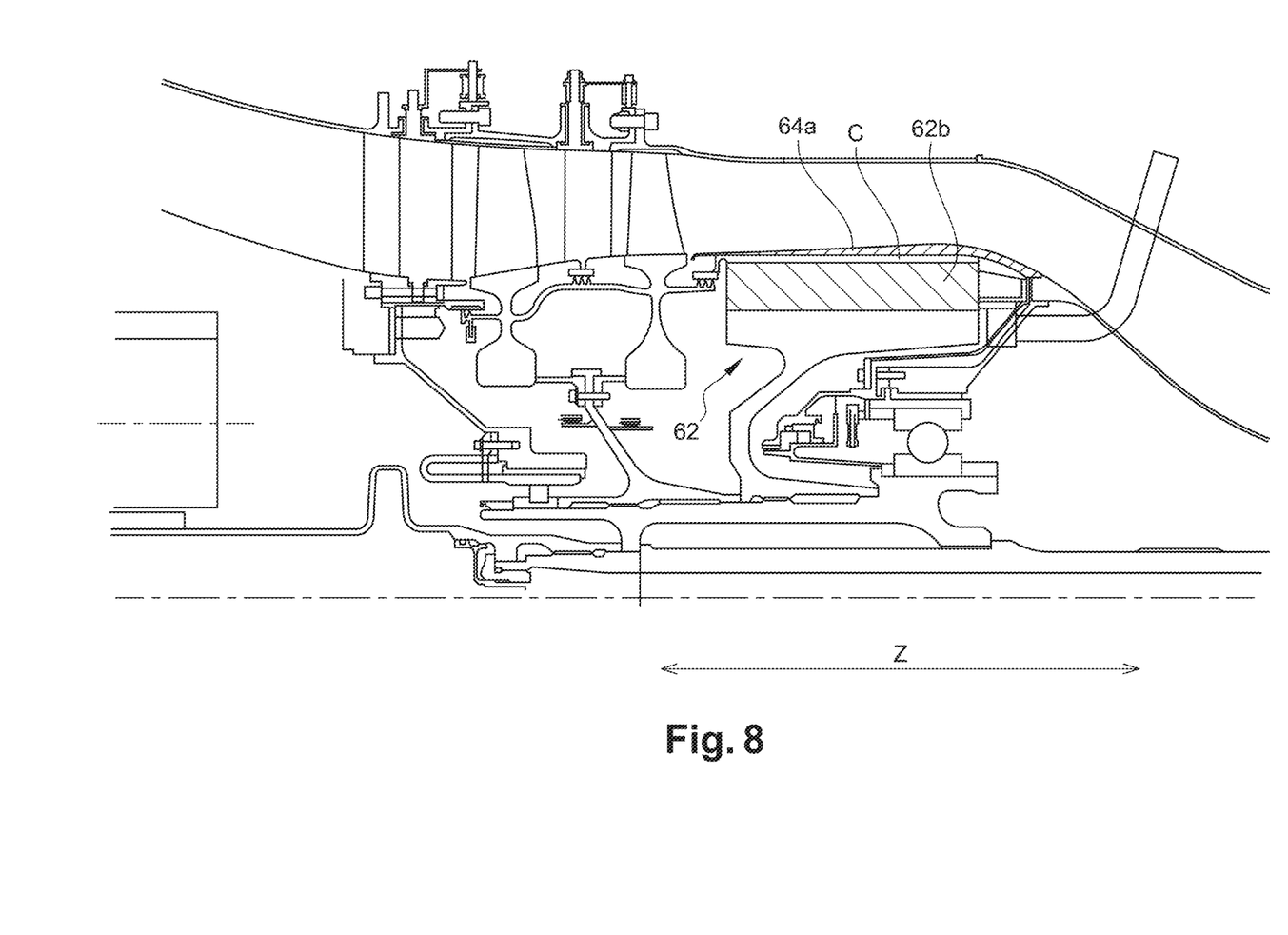
FIG. 8 is a partial schematic half view in axial section of an aircraft turbine engine according to another embodiment of the disclosure.

FIG. 8 illustrates another alternative embodiment of the disclosure. The installation area Z of the electric machine 62 is here similar to that of the embodiment of FIG. 5.

The electric machine 62 is similar to that of FIG. 5 except that the cowl C of its stator 62*b* is dissociated from the shell 64*a*. The other characteristics of this alternative embodiment are similar to those of the embodiment of FIG. 5.

The invention claimed is:

1. An aircraft turbine engine, comprising a gas generator and a fan arranged upstream from the gas generator and configured to generate a main gas flow (F), one portion of which flows in a duct of the gas generator to form a primary flow, and another portion of which flows in a duct around the gas generator to form a secondary flow, the gas generator comprising a low-pressure body that comprises a rotor driving the fan and that comprises a low-pressure compressor situated upstream from an intermediate casing, the turbine engine further comprising an electric machine, wherein the electric machine is mounted coaxially with the rotor of the low-pressure body downstream from the fan and upstream from the intermediate casing, the turbine engine further comprising an intermediate shaft that is formed separately from the rotor of the low-pressure body, driven by the rotor of the low-pressure body and that drives rotors of the electric machine and of the low-pressure compressor, wherein said intermediate shaft has a tubular shape and is configured to be passed through by said rotor of the low-pressure body, the intermediate shaft comprising internal splines configured to be rotationally coupled to said rotor of the low-pressure body, wherein said intermediate shaft comprises adjacent sections configured to be surrounded respectively by a trunnion of the rotor of the low-pressure compressor and by (i) a member connected or attached to the rotor of the electric machine, or (ii) a part connected or attached to the rotor of the electric machine, said intermediate shaft comprising external splines for coupling to the trunnion and coupling to the member or to the part, and wherein said trunnion and either the member or the part are clamped axially against each other and onto a cylindrical shoulder of said intermediate shaft, by a nut fitted and screwed onto said intermediate shaft.

2. The turbine engine according to claim 1, wherein the electric machine is situated upstream from the low-pressure compressor.

3. The turbine engine according to claim 1, wherein the electric machine is situated downstream from the low-pressure compressor.

4. The turbine engine according to claim 1, wherein the electric machine comprises a stator that surrounds the rotor of the electric machine and which is configured to be cooled by said primary flow.

5. The turbine engine according to claim 1, wherein the fan is driven by the rotor of the low-pressure body by means of a reduction gear, the electric machine being situated downstream from the reduction gear which comprises an input shaft, a downstream end of which is engaged on an upstream end of the rotor of the low-pressure body and is clamped axially against said intermediate shaft by a nut fitted and attached on this upstream end.

6. A method of modular assembly of the turbine engine according to claim 5, the method comprising the steps of:
(a) mounting and attaching the rotor of the electric machine and the rotor of the low-pressure compressor on said intermediate shaft by axial translation,
(b) mounting and attaching said intermediate shaft on the rotor of the low-pressure body, by axial translation, and
(c) mounting and attaching the input shaft of the reduction gear on the rotor of the low-pressure body, by axial translation.

7. A method of modular assembly of the turbine engine according to claim 1, comprising the steps of:
(a) mounting and attaching the rotor of the electric machine and the rotor of the low-pressure compressor on said intermediate shaft by axial translation, and
(b) mounting and attaching said intermediate shaft on the rotor of the low-pressure body, by axial translation.

8. The turbine engine according to claim 1, wherein a shell extends around the electric machine, the shell has a radially outer surface swept by the primary flow and has an aerodynamic profile.

9. The turbine engine according to claim 1, wherein the trunnion is annular in shape, has a general T-shape in axial section, and comprises a radial annular leg, an inner periphery of which is connected to a cylindrical leg of the trunnion.

10. The turbine engine according to claim 1, wherein the adjacent sections of the intermediate shaft comprises an upstream section and a downstream section, the trunnion being mounted on the downstream section of the intermediate shaft.

* * * * *